United States Patent
Abuelsaad et al.

(10) Patent No.: US 9,515,975 B2
(45) Date of Patent: Dec. 6, 2016

(54) SOCIAL MEDIA MESSAGE DELIVERY BASED ON USER LOCATION

(71) Applicant: International Business Machines Corporation, Armonk, NY (US)

(72) Inventors: Kelly Abuelsaad, Somers, NY (US); Lisa Seacat DeLuca, Baltimore, MD (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/093,288

(22) Filed: Apr. 7, 2016

(65) Prior Publication Data

US 2016/0212085 A1  Jul. 21, 2016

Related U.S. Application Data

(63) Continuation of application No. 14/227,047, filed on Mar. 27, 2014.

(51) Int. Cl.
*G06F 15/16* (2006.01)
*H04L 12/58* (2006.01)
*H04L 29/08* (2006.01)

(52) U.S. Cl.
CPC ............ *H04L 51/20* (2013.01); *H04L 51/10* (2013.01); *H04L 51/32* (2013.01); *H04L 67/18* (2013.01)

(58) Field of Classification Search
CPC ...................................................... H04L 51/20
USPC ........................................................ 709/206
See application file for complete search history.

(56) References Cited

U.S. PATENT DOCUMENTS

| | | | |
|---|---|---|---|
| 7,742,774 | B2 | 6/2010 | Oh et al. |
| 2006/0288099 | A1 | 12/2006 | Jefferson et al. |
| 2008/0010349 | A1 | 1/2008 | Cai et al. |
| 2010/0026526 | A1 | 2/2010 | Yokota |
| 2011/0246583 | A1 | 10/2011 | Vitaldevara et al. |
| 2013/0150088 | A1 | 6/2013 | Nasir et al. |
| 2013/0340089 | A1* | 12/2013 | Steinberg ............... H04L 63/10 726/27 |
| 2014/0210702 | A1 | 7/2014 | Peterson et al. |

FOREIGN PATENT DOCUMENTS

EP     2043032 A1     4/2009

OTHER PUBLICATIONS

Abuelsaad et al., "Social Media Message Delivery Based on User Location," U.S. Appl. No. 14/227,047, filed Mar. 27, 2014.
IBM List of Patents and/or Patent Publications Treated as Related, Apr. 7, 2016, 2 pgs.

* cited by examiner

*Primary Examiner* — Sahera Halim
(74) *Attorney, Agent, or Firm* — Kristofer L. Haggerty

(57) ABSTRACT

An approach for delaying social media messages is provided herein. A first computing device receives user preferences. The first computing device detects a social media message of a user. The first computing device determines that the user is not in the physical location. The first computing device determines whether to delay the posting of the social media message based on a comparison of the content of the social media message with the received user preferences.

1 Claim, 3 Drawing Sheets

SOCIAL MEDIA MESSAGE DELIVERY BASED ON USER LOCATION

TECHNICAL FIELD

The present invention relates generally to social media, and more particularly to the delivery of social media message based on user location.

BACKGROUND

In today's day and age, social media users share their thoughts, feelings, photos, and even location to the world via social media. The dissemination of information brings knowledge to the masses but also opens a window into a person's life. For example, a social media user posting vacation plans, photos, or messages which contain current location information, may increase the chances of an unwanted guest, such as a burglar, visiting their home. Currently, if a social media user wants to post a message while on vacation, the user must wait until returning home or do so at their own peril while away.

SUMMARY

In one aspect, the present invention provides a method for delaying a social media message based on user location. A first computing device receives user preferences. The first computing device detects a social media message of a user. The first computing determines that the user is not in a physical location. The first computing device determines whether to delay the posting of the social media message based on a comparison of the content of the social media message with the received user preferences.

In another aspect, the present invention provides a computer program product for delaying a social media message based on user location comprising program instructions to receive user preferences; program instructions to detect a social media message of a user; program instructions to determine that the user is not in a physical location; and program instructions to determine whether to delay the posting of the social media message based on a comparison of the content of the social media message with the received user preferences.

In another aspect, the present invention provides a computer system for delaying a social media message based on user location comprising program instructions to receive user preferences; program instructions to detect a social media message of a user; program instructions to determine that the user is not in a physical location; and program instructions to determine whether to delay the posting of the social media message based on a comparison of the content of the social media message with the received user preferences.

In yet another aspect, the present invention provides a method for deploying a system for delaying a social media message based on user location, comprising: providing a computer infrastructure being operable to: receive user preferences; detect a social media message of a user; determine that the user is not in a physical location; and determine whether to delay the posting of the social media message based on a comparison of the content of the social media message with the received user preferences.

DETAILED DESCRIPTION

Figure 1:
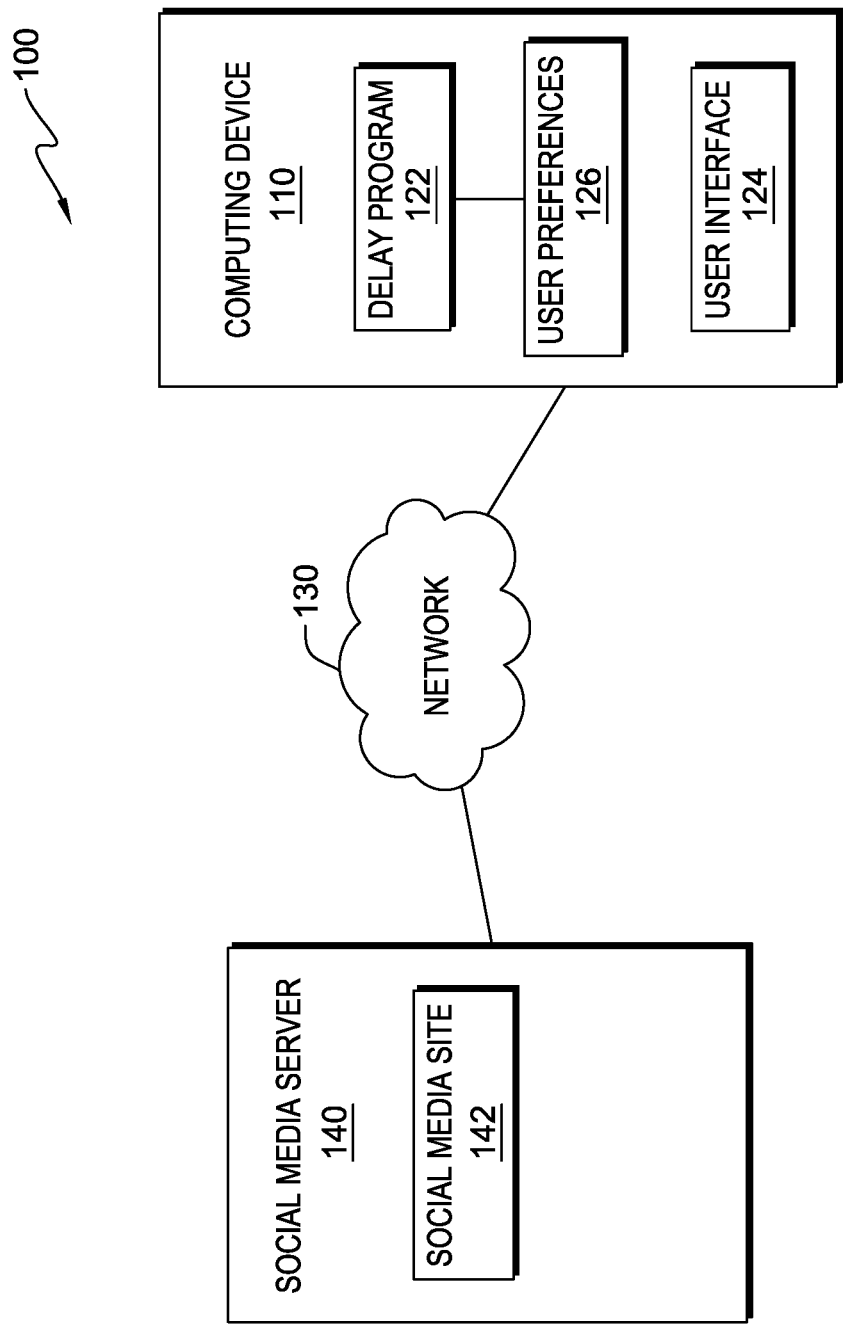
FIG. 1 illustrates a social media message delay system, in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

FIG. 1 illustrates social media delay system 100, in accordance with an embodiment of the invention. In an exemplary embodiment, social media delay system 100 includes computing device 110 and social media server 140 all interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 110 and social media server 140.

Social media server 140 includes social media site 142. Social media server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, social media server 140 can comprise a cluster of web servers executing the same software to collectively process the requests for the web pages as distributed by a front end server and a load balancer. In an exemplary embodiment, social media server 140 is a computing device that is optimized for the support of websites which reside on social media server 140, such as social media site 142, and for the support of network requests related to websites which reside on social media server 140. Social media server 140 is described in more detail with reference to FIG. 3.

Social media site 142 is a collection of files including, but not limited to, for example, HTML files, CSS files, XML files, image files and JavaScript files. Social media site 142 can also include other resources such as audio files and video files. In an exemplary embodiment, social media site 142 is a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn Corporation), or Instagram® (Instagram is a registered trademark of Instagram, LLC).

Computing device 110 includes delay program 122 and user interface 124. In the exemplary embodiment, computing device 110 is a smart phone; however, in other embodiments, computing device 110 may be a desktop computer, a notebook, a laptop computer, a tablet computer, a handheld device, a thin client, or any other electronic device or computing system capable of receiving and sending data to and from social media server 140 via network 130. Computing device 110 is described in more detail with reference to FIG. 3.

User interface 124 includes components used to receive input from a user and transmit the input to an application residing on computing device 110. In an exemplary embodiment, user interface 124 uses a combination of technologies and devices, such as device drivers, to provide a platform to enable users of computing device 110 to interact with delay program 122. In the exemplary embodiment, user interface 124 receives input, such as textual input received from a physical input device, such as a keyboard, via a device driver that corresponds to the physical input device.

In the exemplary embodiment, user preferences 126 contains information that details the home location of the user of computing device 110. In the exemplary embodiment, user preferences 126 also includes delay criteria which describes when to delay posting a social media message to social media site 142 or delay transmission of a social media message to social media server 140. User preferences 126 is described in further detail below with regard to FIG. 2.

Delay program 122 is a software application or configuration in a software application capable of receiving user preferences from a user of computing device 110 via user interface 124. In addition, delay program 122 is capable of determining whether to delay posting of a social media message based on the received user preferences, and capable of storing determined social media messages in a holding queue. As further described below, in an embodiment, delay program 122 may utilize, or be partially or fully integrated with, a GPS system or GPS software. The operations and functions of delay program 122 are described in further detail below with regard to FIG. 2.

Figure 2:
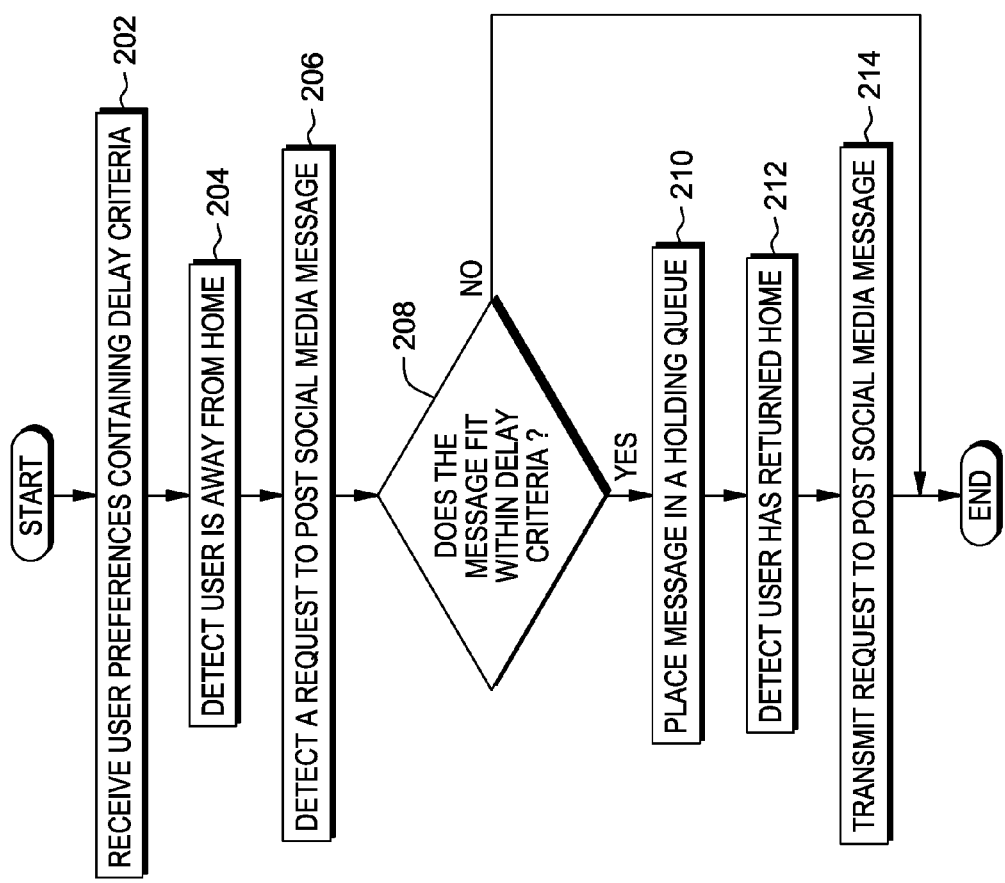
FIG. 2 is a flowchart illustrating the operations of the delay program of FIG. 1 in determining whether to delay a social media message, in accordance with an embodiment of the invention.

FIG. 2 is a flowchart illustrating the operations of delay program 122 in determining whether to delay a social media message based on user preferences, in accordance with an exemplary embodiment of the invention. In an exemplary embodiment, delay program 122 receives user preferences 126, by way of inputs from the user of computing device 110 via user interface 124, which includes delay criteria (step 202). In the exemplary embodiment, the delay criteria includes information regarding whether a social media message should be delayed based on the content of the message. For example, the delay criteria may include information that states a social media message which includes pictures of buildings that show a current location not in the home town of the user should be delayed, while a social media message which includes pictures which show only people do not need to be delayed. In addition, the delay criteria may include information that states a social media message which contains certain keywords describing a location that is not the home town of the user, such as a vacation itinerary, should be delayed, while a social media message which contains certain keywords, such as information related to food, should not be delayed regardless of location. Furthermore, the delay criteria may include information that states a social media message should be delayed if the message contains a certain group of social media users tagged, mentioned, or depicted in the message. For example, if a social media user goes on vacation with immediate family, the social media user may desire to update the delay criteria to delay all social media messages which contain a picture which tag, mention, or depict the entire immediate family of the social media user. In other embodiments, user preferences 126 may contain a default delay criteria made by an administrator or third party.

Delay program 122 then detects that the user of computing device 110 is away from home (step 204). In other embodiments, delay program 122 may detect that the user of computing device is away from another physical location (geographical location). In the exemplary embodiment, delay program 122 detects that the user of computing device 110 is away from home by accessing a calendar or scheduling program present on the computing device 110, or requesting schedule information of the user from a smartphone or personal data assistant. Delay program 122 then compares location information contained in the calendar or schedule to home location information contained in user preferences 126 to determine if the user is away from home. For example, delay program 122 may utilize character recognition software in order to determine if the location information contained in the calendar or schedule matches or is substantially similar to the home location information contained in user preferences 126. In other embodiments, delay program 122 may determine the current location information of the user of computing device 110 by accessing the trip purchase details of the user, accessing a global positioning system (GPS) of the user, such as accessing the GPS software contained in a smartphone of the user, or utilizing cellular triangulation. In further embodiments, the user of computing device 110 may input that the user is away from home into delay program 122 via user interface 124. For example, delay program 122 may provide a selectable option to the user of computing device 110 to denote that the user is, or at a later time will be, away from home.

Delay program 122 then detects that a request to post a social media message (step 206). In the exemplary embodiment, delay program 122 is partially or fully integrated with a web browser contained in computing device 110. In the exemplary embodiment, delay program 122 detects when the social media account of the user of computing device 110 is accessed and a request to post a social media message is made.

Delay program 122 determines whether the social media message fits within the delay criteria detailed in user preferences 126 (decision 208). In the exemplary embodiment, delay program 122 examines the content of the social media message in order to determine whether the social media message fits within the delay criteria. For example, if the delay criteria details that a social media message that contains a picture including the immediate family of the user of computing device 110 is to be delayed, and delay program 122 detects a request to post a social media message containing a picture, delay program 122 examines the content of the social media message, examines the metadata associated with the message, or utilizes facial recognition software to determine whether the immediate family of the user of computing device 110 is present within the picture. Additionally, if the delay criteria details that a social media message containing location information that is not the home location of the user of computing device 110 is to be delayed, delay program 122 examines the content of the message or examines the metadata associated with the message and performs a keyword comparison in order to determine whether the social media message contains location information that is not the home location of the user of computing device 110. In this example, delay program 122 may cross-reference each keyword contained in the social media message with a map or another location reference to determine if any location information is contained in the social media message.

If delay program 122 determines that the social media message does not fit within the delay criteria detailed in user preferences 126 (decision 208, "no" branch), delay program 122 does not delay the posting of the social media message. If delay program 122 determines that the social media message does fit within the delay criteria detailed in user preferences 126 (decision 208, "yes" branch), delay program 122 places the social media message in a holding queue and stores the social media message in memory (step 210). In the exemplary embodiment, the holding queue contains information regarding social media messages being delayed based on comparison with the delay criteria in user preferences 126. In the exemplary embodiment, the holding queue may maintain the social media messages in chronological order or based on a user defined rating system.

Delay program 122 then detects that the user of computing device 110 has returned home (step 212). In the exemplary embodiment, delay program 122 detects the location of the user of computing device 110 in the same manner as described above, such as by way of accessing calendar/scheduling information of the user, the trip purchase details of the user, accessing a global positioning system (GPS) of the user, such as accessing the GPS software contained in a smartphone of the user, or utilizing cellular triangulation. Delay program 122 then compares the location information of the user of computing device 110 to the location information contained in user preferences 126 to determine if the user has returned home. In other embodiments, the user of computing device 110 may input that the user has returned home via user interface 124.

Delay program 122 then transmits a request to social media server 140 to post the social media message (step 214). In the exemplary embodiment, once the social media message is posted to the social media account of the user of computing device 110, delay program 122 removes the social media message from the holding queue and from memory. In addition, in the exemplary embodiment, if more than one social media message is maintained in the holding queue, once delay program 122 determines that the user of computing device 110 has returned home, delay program 122 transmits requests to social media server 140 to post each social media message in the order that the messages were maintained in the holding queue. For example, if the social media messages are maintained in the holding queue in chronological order, delay program 122 transmits a request to post the social media message that was placed in the holding queue first and then proceeds to transmits request for each subsequent social media message.

In other embodiments, delay program 122 may be located on social media server 140. In addition, user preferences 126 may also be transmitted via network 130 and stored on social media server 140. In this other embodiment, delay program 122 determines that the user of computing device 110 is away from home in the same manner as described above. After the user of computing device 110 inputs a social media message into a web browser via user interface 124, computing device 110 transmits a request to post the social media message to social media site 142 on social media server 140 via network 130. Delay program 122, which may be partially or fully integrated with social media site 142, receives or intercepts the social media message and determines whether the posting of the social media message should be delayed based on a comparison to the delay criteria in user preferences 126, performed in a similar manner as described above. If delay program 122 determines the social media message should be delayed, delay program places the social media message in a holding queue and stores the message in memory. Delay program 122 then determines that the user of computing device has returned home in the same manner as described above, and posts the message to social media site 142.

In another embodiment, the invention provides a method that performs the process of the invention on a subscription, advertising, and/or fee basis. That is, a service provider, such as a Solution Integrator, could offer to provide functionality for determining whether to delay a social media message based on user preferences. In this case, the service provider can create, maintain, support, etc., a computer infrastructure, such as social media delay system 100 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for determining whether to delay a social media message based on user preferences. In this case, a computer infrastructure, such as social media delay system 100 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as social media delay system 100 (FIG. 1), from a computer readable medium; (2) adding one or more computing devices to the computer infrastructure; and (3) incorporating and/or modifying one or more existing systems of the computer infrastructure to enable the computer infrastructure to perform the processes of the invention.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
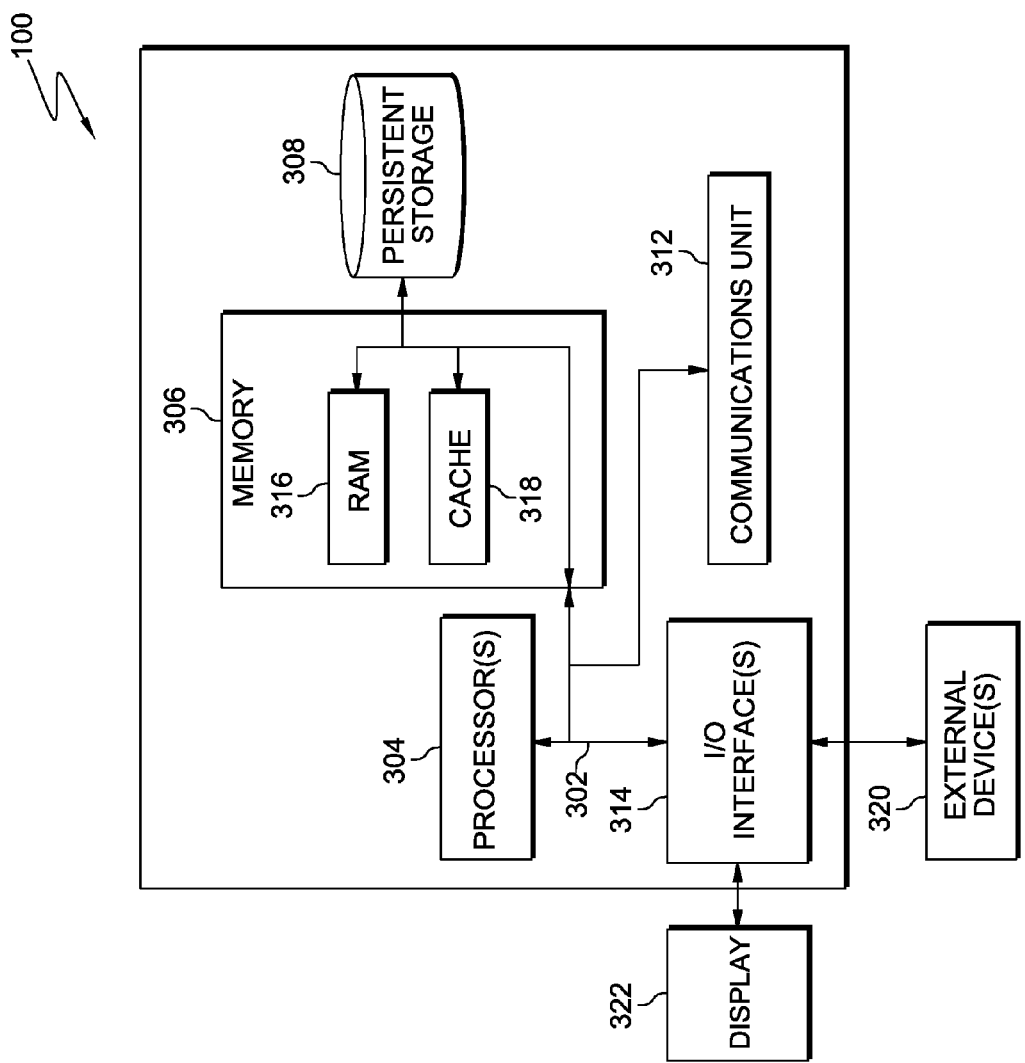
FIG. 3 is a block diagram depicting the hardware components of the social media message delay system of FIG. 1, in accordance with an embodiment of the invention.

FIG. 3 depicts a block diagram of components of computing device 110 and social media server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and social media server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs delay program 122, user preferences 126, and user interface 124 in computing device 110; and social media site 142 in social media server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs delay program 122, user preferences 126, and user interface 124 in computing device 110; and social media site 142 in social media server 140 may be downloaded to persistent storage 308 through communications unit 312.

I/O interface(s) 314 allows for input and output of data with other devices that may be connected to computing device 110 and social media server 140. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs delay program 122, user preferences 126, and user interface 124 in computing device 110, and social media site 142 in social media server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for delaying a social media message, comprising the steps of:
    a first computing device receiving a first location of a user;
    the first computing device detecting a social media message of the user, wherein the social media message includes an image;
    the first computing device determining one or more keywords based on identifying one or more landmarks depicted in the image;
    the first computing device determining a second location of the user by comparing the one or more keywords with a locational reference database;
    the first computing device determining whether the second location of the user is within a threshold distance of the first location of the user;
    based on the first computing device determining that the second location of the user is not within the threshold distance of the first location of the user, the first computing device delaying a request to post the social media message and storing the social media message in a holding queue;
    the first computing device referencing a global positioning system (GPS) corresponding to a device associated with the user to determine one or more GPS coordinates;
    the first computing device determining a third location based on the one or more GPS coordinates;
    the first computing device detecting that the third location of the user is within the threshold distance of the first location of the user; and
    the first computing device transmitting the request to post the social media message.

* * * * *